Figure 1:
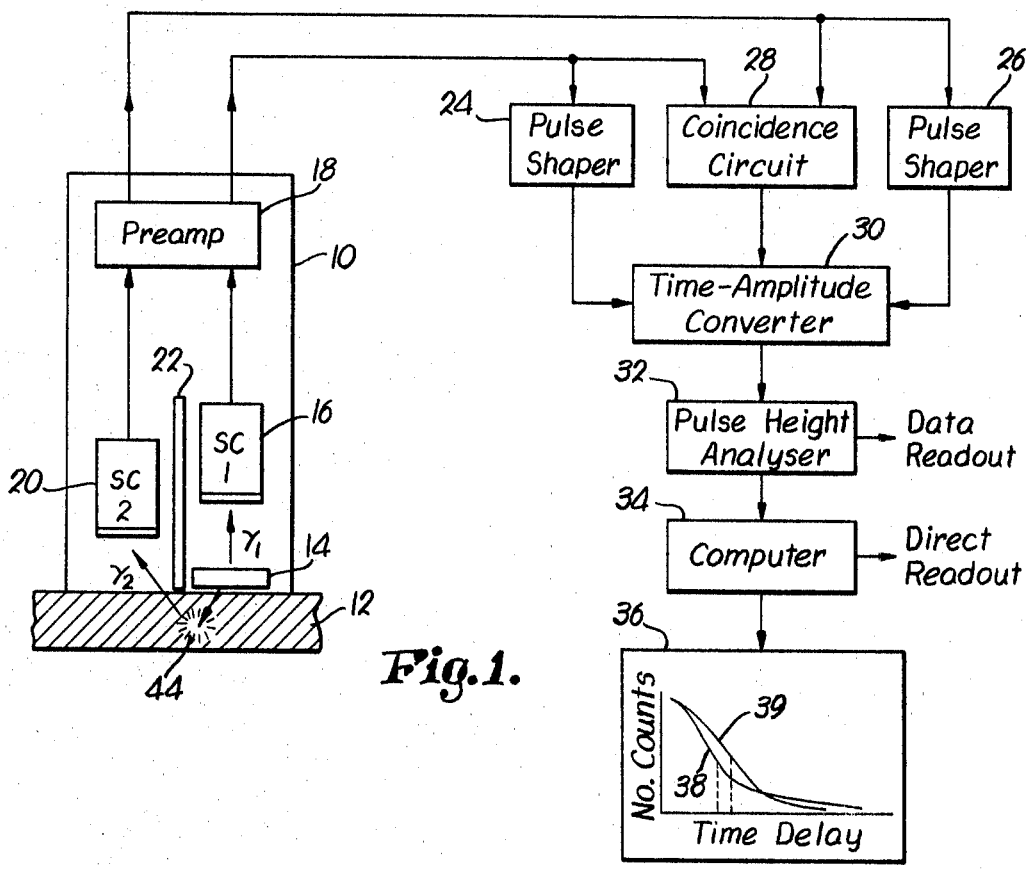

United States Patent

[11] 3,593,025

| [72] | Inventor | Joseph C. Grosskreutz<br>Prairie Village, Kans. |
|---|---|---|
| [21] | Appl. No. | 737,030 |
| [22] | Filed | June 14, 1968 |
| [45] | Patented | July 13, 1971 |
| [73] | Assignee | Midwest Research Institute<br>Kansas City, Mo. |

[54] DETECTING DEFECTS BY DISTRIBUTION OF POSITRON LIFETIMES IN CRYSTALLINE MATERIALS
10 Claims, 2 Drawing Figs.

| [52] | U.S. Cl. | 250/83.3, 250/71.5 |
|---|---|---|
| [51] | Int. Cl. | G01t 1/20 |
| [50] | Field of Search | 250/71.5, 83.3 D |

[56] References Cited
UNITED STATES PATENTS

| 2,903,590 | 9/1959 | Somerville | 250/83.3 D |
| 2,977,478 | 3/1961 | Wuppermann | 250/83.3 D |
| 3,304,424 | 2/1967 | Mills, Jr. | 250/71.5 |
| 3,435,218 | 3/1969 | Allen, Jr. | 250/71.5 |

*Primary Examiner*—Archie R. Borchelt
*Attorney*—D. A. N. Chase

ABSTRACT: A method of nondestructively testing a structural member of crystalline material employs positrons from a radioactive source as a probe to detect the presence of latent defects in the crystalline structure of the member, such as those due to early fatigue damage or microscopic porosity. The half-life of positrons is longer in materials containing such defects than in undamaged materials; therefore, a measurement of the time of existence of positrons in a given material is effected and serves as an indication as to whether the half-life of the positrons in the material under test is longer than normal.

INVENTOR
Joseph C. Grosskreutz

BY Schmidt, Johnson, Hovey,
Williams & Bradley,
ATTORNEYS.

DETECTING DEFECTS BY DISTRIBUTION OF POSITRON LIFETIMES IN CRYSTALLINE MATERIALS

Crystalline materials fail in fatigue because of local concentrations of plastic strain (a strain beyond the elastic limit of the material). The plastic strain, being irreversible, accumulates with repeated fatigue loads and eventually a fatigue crack is initiated which continues to grow with each repeated application of load. In a structural member, failure occurs when the crack extends deeply enough so that the strength of the member is reduced below the normal service load, which may be a combined static and fatigue load.

The damage which accumulates prior to the nucleation of the fatigue crack is microscopic in nature. Such precrack damage is composed of dislocations, dislocation loops and dipoles, or vacancies in the crystalline structure. The accumulation of these crystal defects ultimately results in the nucleation of a microscopic crack by a variety of mechanisms. As the microscopic crack grows, the precrack damage accumulates ahead of the crack tip and, in effect, precedes and signals the arrival of the crack in any given portion of the material.

Early fatigue damage in either of the two stages (crystal defects and the microscopic crack) discussed above is not detectable by nondestructive methods utilizing ultrasonic energy, X-rays, or eddy-current losses as the detection means. Such prior art methods are capable of detecting a crack only after the latter reaches a greater size and after the strength of the material has deteriorated to a point where failure may be imminent. Therefore, in order for a nondestructive testing method to be practical and valuable as a means of determining the presence of weakened structural members in aircraft, vehicles, heavy machinery, bridge structures, etc., it is requisite that the testing method be sensitive to early fatigue damage that occurs well ahead of the nucleation of an apparent crack.

Furthermore, a second possible cause of a weakened condition of a structural member of crystalline material is microscopic porosity. Micropores are accumulation of vacancies (vacancy clusters) in the crystal and are defects introduced into the material during fabrication or processing, such as during the molding, casting or machining of metals.

It is, therefore, the primary object of this invention to provide a method of nondestructively testing a structural member of crystalline material to determine the presence of latent defects in its crystalline structure, such as those due to early fatigue damage or microscopic porosity.

Additionally, it is an important object of this invention to provide a method as aforesaid that may be conveniently practiced on existing structures of various types, such as aircraft, vehicles, heavy machinery, and bridge structures.

Figure 2:
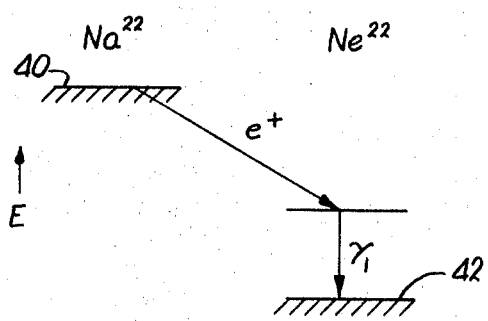

In the drawing:

FIG. 1 is a block diagram and diagrammatic illustration of apparatus for practicing the method of the instant invention; and FIG. 2 is an energy level diagram illustrating the decay of sodium 22.

The half-life of positrons is different in a crystalline material containing dislocations and vacancies. When a positron enters the material, it decreases in speed very rapidly and then seeks out an electron in the material with which it combines. This combination of positive and negative charge results in complete annihilation of both the positron and the electron and the creation of two or three gamma rays. The three gamma ray annihilation is rare. The two gamma ray annihilation is most common and produces two gamma rays each having an energy of 0.51 Mev. Thus, the end of the lifetime of an individual positron is, in most cases, evidenced by the radiation of unique energy. With knowledge of the time of entry of the positron into the material, the time duration of existence of the positron in the material before decay thereof may be ascertained to provide data for half-life computations. It has been found that the half-life of positrons is longer in materials containing dislocations and vacancies, and it is believed that this is due to trapping of the positrons within the voids caused by such crystal defects, resulting in a longer time being required for the positron to seek out and combine with an available electron.

Referring to FIG. 1, a detector head 10 is shown in contact with the surface of a structural member 12 under test. The detector head 10 is illustrated in the form of a housing containing a positron source 14 in the form of a slab of a suitable radioactive substance such as sodium 22. A scintillation counter 16 is disposed directly above the radioactive source 14 and delivers its output to a preamplifier 18. A second scintillation counter 20 is disposed adjacent the counter 16 but is isolated therefrom by a suitable shield 22. Both of the counters 16 and 20 may be of the type employing a plastic scintillator in conjunction with a photomultiplier tube.

The preamplifier 18 separately amplifies each of the outputs from the counters 16 and 20 and feeds the amplified outputs to the inputs of a pair of pulse-shaping circuits 24 and 26 and a fast coincidence circuit 28. The pulse shapers 24 and 26 are employed to decrease the rise time of the pulses from the outputs of preamplifier 18, a rise time on the order of 1 nsec. being desired. The shaped pulses are then delivered to a time-amplitude converter (TAC) 30 which is activated by the output of the coincidence circuit 28.

The TAC 30, upon command by the coincidence circuit 28, measures the time difference between the arrival of pulses from the shapers 24 and 26. The command pulse from the output of circuit 28 is produced if the input pulses to circuit 28 from the preamplifier 18 are sufficiently coincident to be of interest, i.e., within approximately 30 nsec. Therefore, if the time delay between a given $\gamma_1$ and the corresponding $\gamma_2$ is 30 nsec. or less, this is detected by the coincidence circuit 28 and the TAC 30 is activated to measure the length of the delay in terms of the time interval between the leading edges of the two pulses after the rise times thereof are steepened by the pulse shapers 24 and 26.

When activated, the TAC 30 delivers an output pulse having an amplitude proportional to the mentioned time interval between the two signals fed thereto by the pulse shapers 24 and 26. The output pulses from the TAC 30 are fed to a pulse height analyzer (PHA) 32 which then sorts the pulses in accordance with their amplitudes. The PHA 32 has multiple storage channels, each corresponding to a particular time interval, to permit the accumulation of counts corresponding to the various delay times encountered. Assuming that the PHA 32 has an analog memory, the count would be stored in each channel in terms of a voltage dependent upon the size of the count.

Direct data readout from the PHA 32 may be effected, or the PHA memory may be fed to a digital computer 34 for conversion into information appropriate for delivery to an automatic plotter 36. The display of the plotter 36 is illustrated as an X-Y coordinate system wherein the number of counts is plotted as ordinate against time delay as abscissa. If desired, the information from the PHA 32 can be directly converted by the computer 34 into positron half-life, as indicated by the provision for direct readout.

The radioactive decay of sodium 22 is illustrated in FIG. 2. Before emission of a positron $e^+$, sodium 22 has a ground state 40 of greater energy than the ground state 42 of neon 22, the element formed by radioactive decay. It can be seen from the graph of FIG. 2 that the emission of the positron is accompanied by the emission of a "prompt" gamma ray $\gamma_1$, the latter having an energy of approximately 1.3 Mev.

In the practice of the method of the instant invention, the source 14 is disposed in close proximity to a selected surface zone of the member 12. This may be effected, for example, by providing the housing of the detector head 10 with an opening, such as the open lower end illustrated, so that source 14 may be placed in substantial overlying relationship to the surface of the member 12. The energy of the positrons emitted from the source 14 will depend upon the source substance utilized; in general, the positron will penetrate the surface of the member 12 to a depth of between approximately one-tenth to three-eighths of an inch. This is sufficient penetration since early fatigue damage inherently begins at the surface of a member and micropores are found at or adjacent the surfaces of a material.

The $\gamma_1$ radiation is sensed by the scintillation counter 16 and output pulses are produced having heights proportional to the energy of the scintillations, the output count being amplified and fed to the pulse shaper 24 and the coincidence circuit 28. The input of the circuit 28 receiving the output of the counter 16 employs a pair of series gates to provide a window for the pulse height corresponding to $\gamma_1$ radiation, it being remembered that each $\gamma_1$ ray has an unique energy of 1.3 Mev. Thus, the first gate would reject all pulses representing energies of less than approximately 1.3 Mev., while the second gate would eject all pulses representing energies greater than approximately 1.3 Mev., thereby providing a window for the desired pulse information.

In FIG. 1 a position is illustrated entering the member 12 and combining with an electron at 44 where both are annihilated and the two gamma rays $\gamma_2$ are emitted. The $\gamma_2$ rays are of unique energy, 0.51 Mev. as discussed above, and are sensed by the scintillation counter 20, the output of the latter being fed to the pulse shaper 26 and the other input of the coincidence circuit 28. This input employs a pair of series gates to provide a window for the pulse height corresponding to $\gamma_2$ radiation. In this manner, the use of windows in the two inputs of the circuit 28 prevents confusion of information since it may be expected that some of the $\gamma_1$ and $\gamma_2$ radiation will reach both of the counters 16 and 20.

If two pulses are received by the coincidence circuit 28 through the respective input windows thereof and such pulses have a time spacing no greater than approximately 30 nsec., this is sensed by circuit 28 and an output pulse in the form of an activation command is delivered to the TAC 30, which is also receiving the same two pulses as modified in form by the pulse shapers 24 and 26 to decrease the rise times thereof. The time interval between the leading edges of the two pulses reaching the TAC 30 from the pulse shapers 24 and 26 is measured, and an output pulse is delivered having a height proportional to the interval. This occurs continuously as the TAC 30 is repeatedly activated by the coincidence circuit 28 in response to the arrival of pulses representing the generation of $\gamma_1$ and $\gamma_2$ radiation.

Pulses from preamplifier 18 of greater than the 30 nsec. spacing do not activate the circuit 28; therefore, the delay between such pulses is not measured by the TAC 30.

Assuming for purposes of illustration that the PHA 32 has 1,000 storage channels, then the maximum delay interval (30 nsec.) could be divided into 1,000 subintervals of 30 psec. each. Thus, the number of counts stored in the first channel of the PHA 32 would represent a delay of 0 to 30 psec., the second channel would represent 30 to 60 psec., etc.

Referring to the display of the automatic plotter 36, a first curve 38 is illustrated which, it is assumed, represents the distribution of time delays in a material which neither contains early fatigue damage nor micropores. The second curve 39 is illustrative of the distribution of the counts if early fatigue damage or micropores are present in the material. In analyzing the redistribution of counts as seen by a comparison of curves 38 and 39, it is noted that, graphically speaking, the curve 38 undergoes a centroid shift or slope change to form the curve 39. In effect, some of the positrons which would have decayed in shorter times now decay after longer time intervals, thereby causing a reduction in the number of counts for lesser time delays and an increase in the number of counts for relatively greater time delays. Thus, the curve 39 indicates that the half-life of positrons in the material has increased, as represented by the broken line projected from the half-life point on curve 39 to the time axis. Note a similar projection for the curve 38. It is appreciated, of course, that the automatic plotter 36 does not compute half-life but its display is indicative of a change in half-life as represented by the curve comparison just discussed. Manifestly, the degree of centroid shift or slope change is indicative of the degree of early fatigue damage or the extent of microporosity in the material. As an alternative, of course, the digital computer 34 may be programmed to read directly in terms of positron half-life. In the absence of the availability of the computer 34 and the automatic plotter 36, the counts stored in the memory channels of the PHA 32 may be read out directly onto a teletype, for example, and the curve representing the number of counts versus time delay plotted by hand.

In some test situations various zones of the structural member known to be points of high stress may be desired to be tested, in which case the detector head 10 would be moved from zone to zone and left in position at each zone for a sufficient time period to permit the number of counts to build up in the channels of the PHA 32 and assure that, from a statistical standpoint, a uniform distribution of positron bombardment has occurred throughout the zone. The data obtained at the various zones under test may then be compared, and a comparison also made between such data and the normal count versus delay curve or half-life.

Having thus described the invention, what I claim as new and desired to be secured by Letters Patent is:

1. A method of nondestructively testing a structural member of crystalline material to determine the presence of latent defects in its crystalline structure, such as those due to early fatigue damage or microscopic porosity, said method comprising the steps of:
   subjecting a selected zone of said member to positron radiation;
   sensing the timing of the application of the positrons to said zone;
   detecting the emission of characteristic energy produced upon annihilation of each positron introduced into the member at said zone;
   sensing the timing of said characteristic energy emissions; and
   measuring the delay between the time of application of each positron to said zone and the time of emission of said energy resulting from its annihilation to determine the lifetimes of the positrons introduced into the member at said zone and thereby obtain an indication of the half-life thereof, whereby a longer half-life than the normal half-life of positrons in the same material indicates that the member is defective.

2. The method as claimed in claim 1, wherein is provided the additional step of:
   detecting any change from normal in said delay to thereby provide the indication that the member is defective.

3. The method as claimed in claim 1, wherein is provided the additional steps of:
   obtaining an indication of the half-life of positrons in said material at a second selected zone of said member; and
   detecting any difference in the half-lives of the positrons at the first-mentioned zone and the second zone.

4. A method of nondestructively testing a structural member of crystalline material to determine the presence of latent defects in its crystalline structure, such as those due to early fatigue damage or microscopic porosity, said method comprising the steps of:
   providing a source of positron radiation;
   directing positrons from said source into said member at a selected zone thereof;
   sensing the timing of the application of said positrons to said zone;
   sensing the annihilation of the positrons introduced into the member at said zone;
   measuring the time interval between the time of application of each positron to said zone and the annihilation thereof to determine the lifetimes of the positrons introduced into the member at said zone; and
   detecting any change from normal in said measured time intervals indicative of a longer half-life than the normal half-life of positrons in the same material to indicate that the member is defective if said change is detected.

5. The method as claimed in claim 4, wherein said sensing of the annihilation of the positrons includes detecting the emission of characteristic energy produced when each positron is annihilated, and sensing the timing of said characteristic energy emissions, and wherein said time interval measuring is effected by measuring the delay between the time of application of each positron to said zone and the time of emission of said energy.

6. The method as claimed in claim 4, wherein said detecting of any change from normal in said time intervals includes counting the number of positrons annihilated at each of a plurality of said time intervals.

7. The method as claimed in claim 6, wherein said detecting of any change from normal in said time intervals further includes graphically displaying the distribution of the counts over said plurality of time intervals.

8. The method as claimed in claim 4, wherein said detecting of any change from normal in said time intervals includes determining the number of positrons annihilated at each of a plurality of said time intervals to thereby determine the distribution of the individual lifetimes of the positrons over a period extending from the shortest to the longest of said intervals.

9. A system for nondestructively testing a structural member of crystalline material to determine whether latent defects such as those due to early fatigue damage or microscopic porosity are present in the crystalline structure of the member, said system comprising:
a source of positron radiation for directing positrons into said member at a selected zone thereof;
means for sensing the timing of the application of said positrons to said zone;
means for sensing the annihilation of the positrons introduced into the member at said zone;
means coupled with said application sensing means and said annihilation sensing means and responsive thereto for measuring the time interval between the time of application of each positron to said zone and the annihilation thereof, whereby to determine the lifetimes of the positrons introduced into the member at said zone; and
means coupled with said interval measuring means and responsive to time interval information therefrom for analyzing said information to provide an indication that the member is defective if the distribution of the individual lifetimes of the positrons is indicative of an increase in the half-life of the positrons as compared with the normal half-life of positrons in the same material.

10. A system for nondestructively testing a structural member of crystalline material to determine whether latent defects such as those due to early fatigue damage or microscopic porosity are present in the crystalline structure of the member, said system comprising:
a source of positron radiation for directing positrons into said member at a selected zone thereof;
means for sensing the timing of the application of said positrons to said zone;
means for sensing the annihilation of the positrons introduced into the member at said zone;
time interval measuring means coupled with said application sensing means and said annihilation sensing means and responsive thereto for delivering output information indicative of the time interval between the time of application of each positron to said zone and the annihilation thereof, and thus indicative of the lifetimes of the positrons introduced into the member at said zone; and
means coupled with said measuring means and receiving said output information therefrom for analyzing said information to determine the number of positrons annihilated at each of a plurality of said time intervals to provide an indication that the member is defective if the distribution of the individual lifetimes of the positrons is indicative of an increase in the half-life of the positrons as compared with the normal half-life of positrons in the same material.